US008386410B2

(12) United States Patent
Gopisetty et al.

(10) Patent No.: US 8,386,410 B2
(45) Date of Patent: Feb. 26, 2013

(54) SYSTEM AND METHOD FOR SEMANTIC INFORMATION EXTRACTION FRAMEWORK FOR INTEGRATED SYSTEMS MANAGEMENT

(75) Inventors: Sandeep Gopisetty, Morgan Hill, CA (US); Ramani R. Routray, San Jose, CA (US); Aameek Singh, University Place, WA (US); Sandeep M. Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 12/507,630

(22) Filed: Jul. 22, 2009

(65) Prior Publication Data

US 2011/0022562 A1    Jan. 27, 2011

(51) Int. Cl.
    G06F 17/00    (2006.01)
    G06N 5/02    (2006.01)
(52) U.S. Cl. ........................................................ 706/48
(58) Field of Classification Search ..................... None
    See application file for complete search history.

(56) References Cited

U.S. PATENT DOCUMENTS

| | | | |
|---|---|---|---|
| 5,189,709 A | | 2/1993 | Wang et al. |
| 5,822,743 A | * | 10/1998 | Gupta et al. .................. 706/50 |
| 6,405,190 B1 | | 6/2002 | Conklin |
| 2005/0160107 A1 | * | 7/2005 | Liang ........................... 707/100 |
| 2006/0089947 A1 | | 4/2006 | Gallivan et al. |
| 2007/0016563 A1 | | 1/2007 | Omoigui |
| 2007/0038610 A1 | | 2/2007 | Omoigui |
| 2007/0043803 A1 | | 2/2007 | Whitehouse et al. |
| 2008/0021700 A1 | | 1/2008 | Moitra et al. |
| 2008/0082380 A1 | | 4/2008 | Stephenson |

OTHER PUBLICATIONS

Aamodt et al. "Case-Based Reasoning: Foundational Issues, Methodological Variations, and System Approaches", 1994, AI Communications. IOS Press, vol. 7: 1, pp. 27.*
Peng et al. "Mining Logs Files for Computing System Management", Automatic Computing, 2005, pp. 9.*
Distributed Management Task Force, Inc. (DMTF), Common Information Model (CIM) Infrastructure, Doc. No. DSP0004, Version 2.5.0, Chapter 1-2.2, May 1, 2009.
Storage Networking Industry Association (SNIA), Storage Management Technical Specification, Overview, Version 1.4.0, Revision 4, Chapter 4, pp. 7-13, Apr. 3, 2009.
Hewlett-Packard (HP), HP Systems Insight Manager 5.3 Technical Reference Guide, Edition 5.3, Chapter 3, pp. 33-41, published Jan. 2009.
International Business Machines (IBM), IBM Tivoli Storage Productivity Center (TPC) Suite, downloaded at ibm.com/storage/software/center, Apr. 2009.
EMC2, EMC Ionix ControlCenter Software Family, Data Sheet H1082.6, May 2009.

* cited by examiner

Primary Examiner — Jeffrey A. Gaffin
Assistant Examiner — Li-Wu Chang
(74) Attorney, Agent, or Firm — Kenneth L. Sherman, Esq.; Michael Zarrabian, Esq.; Sherman & Zarrabian LLP

(57) ABSTRACT

The invention provides an enterprise administration system and method. The system includes a user interface module configured to enter administration terms or select a predetermined script of administration terms, a knowledge base configured to store system information, a meta information module configured to use the system information to store entity-objective indexes, and a workflow mapping module configured to map the administration terms to system information extraction tasks to extract relevant entities and objectives and apply a rule to the extracted entities and objectives for presenting the extracted entities and objectives in a ranked order.

18 Claims, 4 Drawing Sheets

SYSTEM AND METHOD FOR SEMANTIC INFORMATION EXTRACTION FRAMEWORK FOR INTEGRATED SYSTEMS MANAGEMENT

BACKGROUND OF THE INVENTION

1. Field of the Invention

The present invention relates generally to enterprise systems management, and in particular, to extracting relevant information based to assist in system administration.

2. Background Information

As businesses rely more and more on technology and computation, the Information Technology (IT) backends supporting these business objectives grow in complexity exponentially. It is becoming common for larger enterprise environments to have peta-byte scale storage with thousands of application servers and complex network interconnectivity in a single data center. Managing such environments is not just challenging due to its scale, but also due to immense heterogeneity of devices co-existing in the environment. As an example, a common administrator frustration is the inability of one storage vendor's management product to not even discover the devices from another vendor, even though they exist in the same network fabric.

As systems management begins to take the dominant share of the overall IT budget, there have been various initiatives to develop standardized mechanisms for reporting device information, for example, the Common Information Model (CIM) from Distributed Management Task Force, Inc. (DMTF) and the Storage Management Initiative Specification (SMI-S) from The Storage Networking Industry Association (SNIA). While products based on such efforts are increasing in popularity, they continue to be highly "data" driven. The objective of such tools is primarily to obtain and report data about attributes and characteristics of the enterprise IT environment.

This is a clear disconnect from the actual administrative objectives which tend to be more "task" driven. Administrators have to perform tasks like resource provisioning, problem determination, performance management, asset usage optimization, backup and disaster recovery. In the current IT environment, accomplishing such tasks requires obtaining data from multiple devices (through management databases and/or unstructured log files), correlating this information with the workloads and usage patterns (performing ad-hoc historical and future what-if analysis) and then developing plans to meet the desired objectives. Obtaining this information often requires complex interplay of multiple graphical user interfaces (GUIs), spreadsheets, post-it markers and back-of-the envelope calculations. As an example, trying to determine the cause of poor performance of a Systems Application Product (SAP) would require analysis of host servers running the application, Host Bus Adapter (HBA) performance impacting the host Input/Output (I/O) throughput, database performance for current workloads, network bandwidth congestion, switch congestion, storage sub-system loads and failures. Such a manual system management style is not only just expertise-intensive, it is also highly unscalable, slow, and error prone.

One approach for alleviating these concerns is to develop numerous monolithic task modules—one each for every conceivable administrative task, such as problem determination, usage optimization, etc. Such an approach is not only hard to implement because it is highly resource intensive and varying with differences in data center environments, it is also very expensive to maintain and cannot be customized enough for each different administrator.

SUMMARY OF THE INVENTION

The invention provides an enterprise administration system and method. The system includes a user interface module configured to enter administration terms or select a predetermined script of administration terms, a knowledge base configured to store system information, a meta information module configured to use the system information to store entity-objective indexes, and a workflow mapping module configured to map the administration terms to system information extraction tasks to extract relevant entities and objectives and apply a rule to the extracted entities and objectives for presenting the extracted entities and objectives in a ranked order.

Another embodiment of the invention involves a method. The method includes storing system information to form a knowledge base, receiving administration terms related to a system administration objective; storing metadata of entity-objective indexes in the knowledge base, and mapping the administration terms to information extraction tasks to extract relevant entities and objectives and apply a rule to the extracted entities and objectives for presenting the extracted entities and objectives in a ranked order.

Yet another embodiment of the invention involves a computer program product for assisting system administration that causes a computer to store system information to form a knowledge base, receive administration terms related to a system administration objective, store metadata of entity-objective indexes in the knowledge base, and map the administration terms to information extraction tasks to extract relevant entities and objectives and apply a rule to the extracted entities and objectives for presenting the extracted entities and objectives in a ranked order.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments for a system and method providing system administration assistance, as well as operation and/or component parts thereof. While the following description will be described in terms of system administration for clarity and to place the invention in context, it should be kept in mind that the teachings herein may have broad application to all types of systems, devices and applications.

The invention provides an enterprise administration system and method. The system includes a user interface module configured to enter administration terms or select a predetermined script of administration terms, a knowledge base configured to store system information, a meta information module configured to use the system information to store entity-objective indexes, and a workflow mapping module configured to map the administration terms to system information extraction tasks to extract relevant entities and objectives and apply a rule to the extracted entities and objectives for presenting the extracted entities and objectives in a ranked order.

Figure 1:
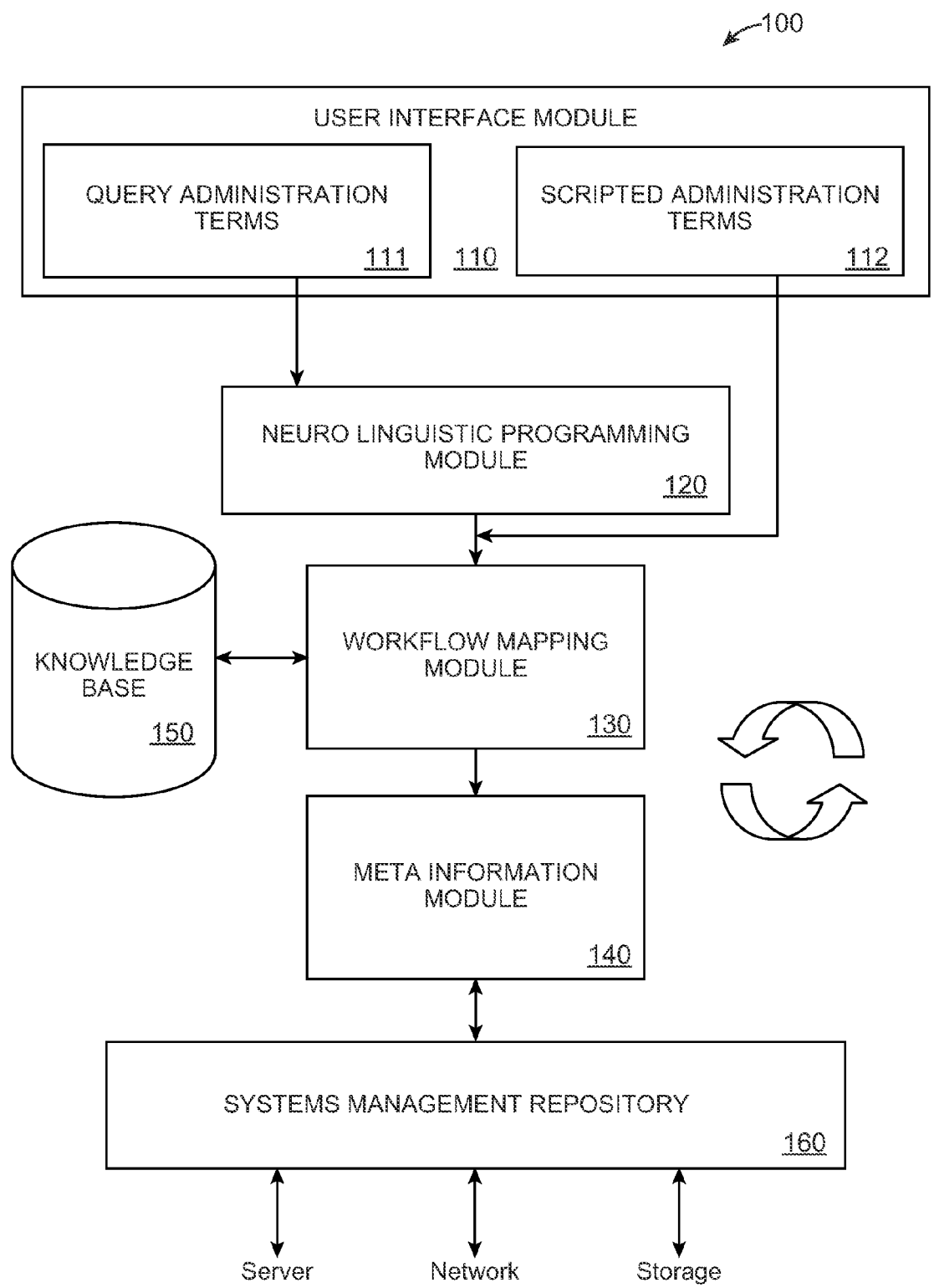
FIG. 1 illustrates a block diagram of a system administration system according to an embodiment of the invention.

FIG. 1 illustrates enterprise administration system 100 according to one embodiment of the invention. In one embodiment of the invention, the user interface module 110 provides a search-based interface where administrators specify the task they want to accomplish. To enter search terms, system 100 includes a user interface module 110. In one embodiment of the invention, user interface module 110 includes a module 111 for receiving administration terms for a query to provide system administration assistance information. In another embodiment of the invention, the user interface module 110 includes a module 112 for selecting scripted administration terms. In one embodiment of the invention, the administration terms entered using module 111 are input in a natural language format. In one embodiment of the invention, the natural language input must be placed in a standard normalized query format. In this embodiment of the invention, neuro linguistic programming (NLP) module 120 is used to convert the natural language entered into a standard normalized query format. In one embodiment of the invention, known NLPs are used. In other embodiments, NLPs are specifically designed based on language, slang used, etc. In one embodiment of the invention, module 112 includes a selection of administration terms that is selected and entered into the system 100 in a normalized query format and the entry of the administration script bypasses NLP 120.

In one embodiment of the invention, a system administrator or similar IT professional enters administration query terms via the user interface module 110 that are relevant to an objective or goal. These objectives or goals can be related to the performance of an enterprise system, enterprise problems, software/hardware issues, maintenance, etc. In one embodiment of the invention, a user enters administration terms through a communication device connected to system 100. In one embodiment of the invention, the communication device can be a keyboard, a touch screen, a microphone, a cell phone, a pointing device, etc. In one embodiment of the invention, system administration scripted terms can be selected from known means, such as a drop down menu on a display, a list, icons, multiple layered lists/menus, partial entry and selection based on the entry, etc.

In one embodiment of the invention, system 100 includes a workflow mapping module 130, meta information module 140, a knowledge base 150 and a systems management repository 160. In one embodiment of the invention, a layered approach is used to map the administrator query terms to information extraction tasks, which in turn are mapped to aggregating relevant data from the underlying system resource monitor (SRM).

In one embodiment of the invention, the knowledge base 150 captures system management task workflows and best practices. In one embodiment of the invention, the knowledge base captures system information such that management task workflows and best practices are derived from application specific domain knowledge, industry specific domain knowledge, consultant recipes and diagnosis patterns for specific environments and problem scenarios. Workflows are based on intelligent heuristics of data of relevant paths, failures, historic loads, configuration Changes, event logs applicable for the particular search context. Best practices are generated manually by large service teams analyzing large sets of configuration data using tools for that system domain. Automatic generation of best practices can also be done by using machine learning or by using the combination of machine learning and manual techniques described before. Workflow information can be represented in a relational database, meta languages like XML or its derivations such as policy languages, workflow languages.

It should be noted that SRMs used by one embodiment of the invention are composed of basic components, such as discovery, control, monitoring and reporting functions. These components query IT devices using a common information model (CIM), simple network management protocol (SNMP), or proprietary protocols to retrieve system configuration, statistics and event data from a server device(s), a network(s), storage device(s), etc. This information is stored in the repository 160 as a combination of structured and semi-structured log data. In one embodiment of the invention the repository 160 retains the data typically for weeks and months for historic analysis and optimization.

In one embodiment of the invention, the meta information module 140 builds on the SRM repository schema. The meta information module 140 captures ontologies to describe what information is captured in each of the repository 160 tables. In one embodiment of the invention, meta information is represented as Entity-Goal Indexes (EGI), where each EGI is one or more pairs of the form <Table-name, Column-range> or <log-files>.

Figure 2:
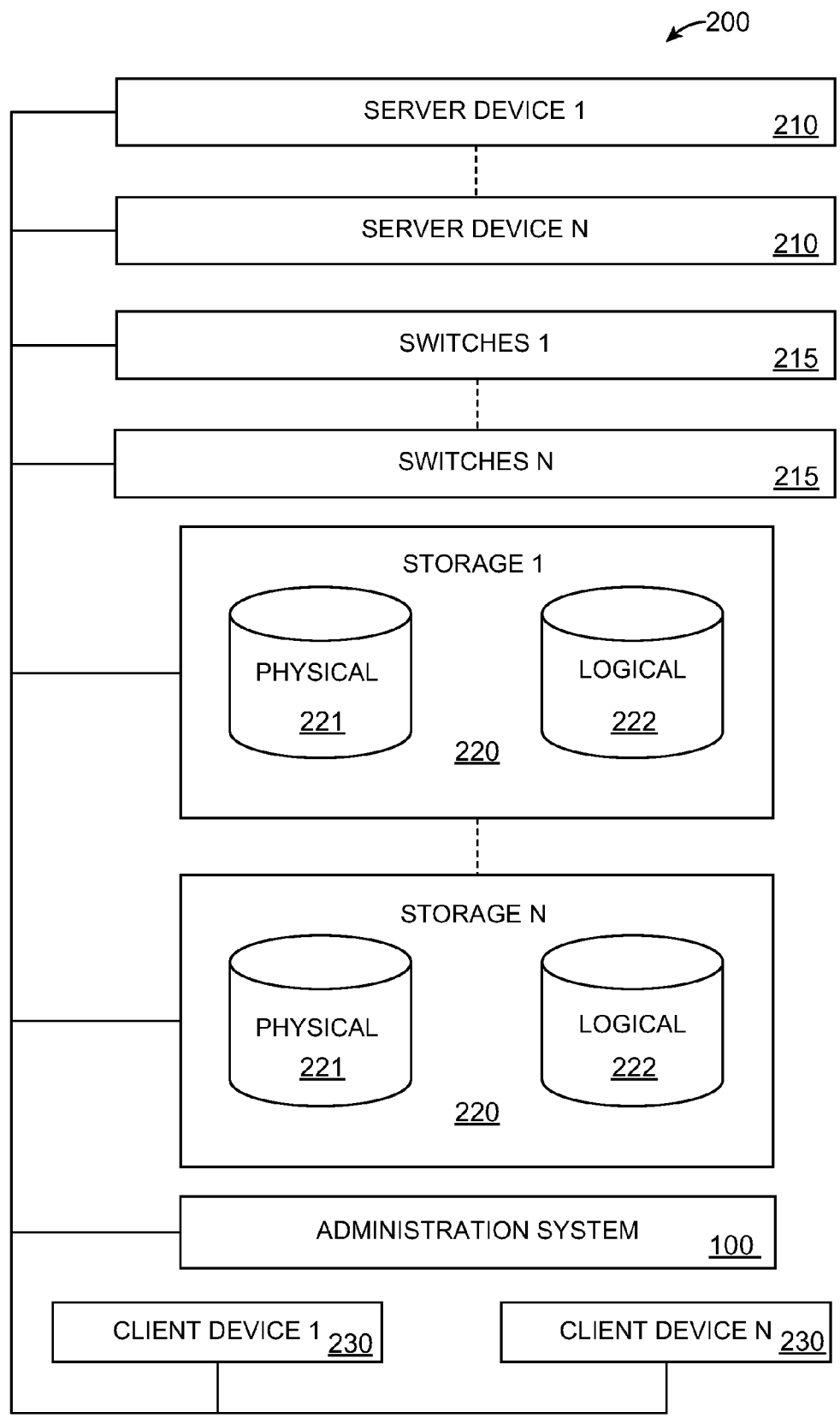
FIG. 2 illustrates an enterprise system including a system administration system shown in FIG. 1 according to an embodiment of the invention.

FIG. 2 illustrates system 100 as part of an enterprise system 200 including server devices 1-N 210, switches 1-N 215, storage units 1-N 220 that include physical memory 221 and logical memory 222, and client devices 1-N 230. An Entity is a logical and/or physical device that is tracked by the SRM, such as switches 215, applications, server devices 210, client devices 230, physical storage 221, logical storage 222, etc. A goal is a measurable value that quantifies the entity's behavior e.g., performance, availability, failures. An example of an EGI is a Switch-Performance Index with information regarding tables and columns that record the relevant information.

In one embodiment of the invention, the workflow mapping module 130 defines abstract templates to translate the administration query into information extraction tasks. The workflow mapping module 130 takes the normalized query from the NLP 120 or from the scripted administration terms 112 as an input, and extracts the relevant entities along with the objective that the user or administrator is trying to accomplish (e.g., causes of performance degradation). In one embodiment of the invention, the workflow mapping module 130 uses the knowledge base 150 to find recipes for a given entity and objective pair. In one embodiment of the invention, the workflow mapping module 130 starts by creating an abstract dependency tree for logical and physical entities relevant to the administration query, and applies the "degraded" recipe on each of the entities in the tree. The recipe enumerates the information to be extracted and presented to the user/administrator. In one embodiment of the invention, a recipe defines rules for analyzing the extracted data (e.g., compare the difference between historic and current switch loading). If the analyzed value is beyond a threshold, a flag, bit, variable, etc. is set to indicate the relevance of the data, which translates to a higher ranking.

In one embodiment of the invention, system 100 uses a combination of workflow recipes as well as entity-goal ontologies to extract and rank relevant data, which is presented to a user or system administrator through display means, such as a display device, a printout, a video file, etc. In an example for system application products (SAP) performance degradation, system 100 would present a list of relevant configuration, performance (current as well as historic), and log events related to the devices in the SAP invocation path. According to one embodiment of the invention, system 100 assists in minimizing the time it takes a user or administrator to receive the system information, and allows users or administrators to focus on analyzing the received information for deciding corrective actions.

In one embodiment of the invention, the system 100 does not pin-point the exact cause for a particular system state, but provides "intelligence" in collecting all the relevant data that is useful to the user or administrator based on the entered query.

For ease of understanding, two examples are discussed herein. The first example relates to a degraded application performance in system 200. In this example scenario, assume an administrator is querying about the degraded performance for a mySAP application through the user interface module 110. The query is transformed into a standard format defined by our system through NLP 120 processing or script parsing of a script transferred from the module 112. In one embodiment of the invention, internal transformed structure of the query is represented as:

Entity: mySAP (Application of type mySAP with a unique ID in the system)
Goal: Performance
Objective: Degraded Performance This internal represented information is then passed onto the workflow mapping module 130. The workflow mapping module 130 communicates with the knowledge base 150 having recipes that captures all the physical, logical and semantic relationships of entities and attributes with the aspects. For this example, recipes related to following categories are selected:

Application Topology Hierarchy
Application Performance Characteristics
Server
HBA, Port, MultiPath
Configuration change Events
Temporal Performance characteristics
Network
IP Network of Ethernet Switch, Router
FC (Fiber Channel) Network, Fabric, Switch
Configuration Change Events (e.g., Zoning changes, Switch removal from fabric, switch failure)
Temporal Performance Characteristics
Storage
FCPort, Masking/Mapping
StoragePool, StorageVolume hierarchy
Configuration change events (e.g., mask/map changes, extra workload, new volume and data creation, RAID rebuild)
Temporal Performance characteristics For each of the above progressive hierarchical recipe execution, the workflow mapping module 130 works iteratively in conjunction with the meta information module 140 to correlate, query and compute information from the data stored in the SRM repository 160. In this example, the mySAP application is hosted on one server device 1-N 210 with one HBA and two ports. Data from this application flows to a set of volumes through one fabric composed of four switches 1-N 215.

Following the recipes, based on presented information, the administrator can conclude in the first step that, FC Network seems to be the search result with the highest rank because one of the switches 1-N 215 in the fabric used by this application has failed (e.g., value of T RES SWITCH.OPERATIONAL STATUS pointing to failed). Upon administrator invocation, further recipes of Application! FC Network! Performance execution leads to the next set of results that edge switches 1-N 215 connected to a storage device 1-N 220 is overloaded and shows a huge change in temporal performance characteristics. Association of Recipe(s), layer of recipe(s) and their association with <entity, goal, objective> is captured in the knowledge basing of recipes with entity.

In one embodiment of the invention, system management tools store all the configuration information for the knowledge base 150 in a database. Detailed logs about the specific actions are stored in files with pointers from the database. Recipes to correlate information with from across actions/tasks, job status, logs are stored in the workflow mapping module 130 and the meta information module 140. For example, a search query of "Failed Asset Discovery Job" would follow the recipe of classifying Discovery jobs from CIM, SNMP and proprietary agent perspective. Results of this query can correlate structured data from the database and unstructured data from files in logs and return a result such as:

one of the discovery job failed
discovery mechanism was CIM
based on error code in log, reason is the unreachability of CIMOM.

Figure 3:
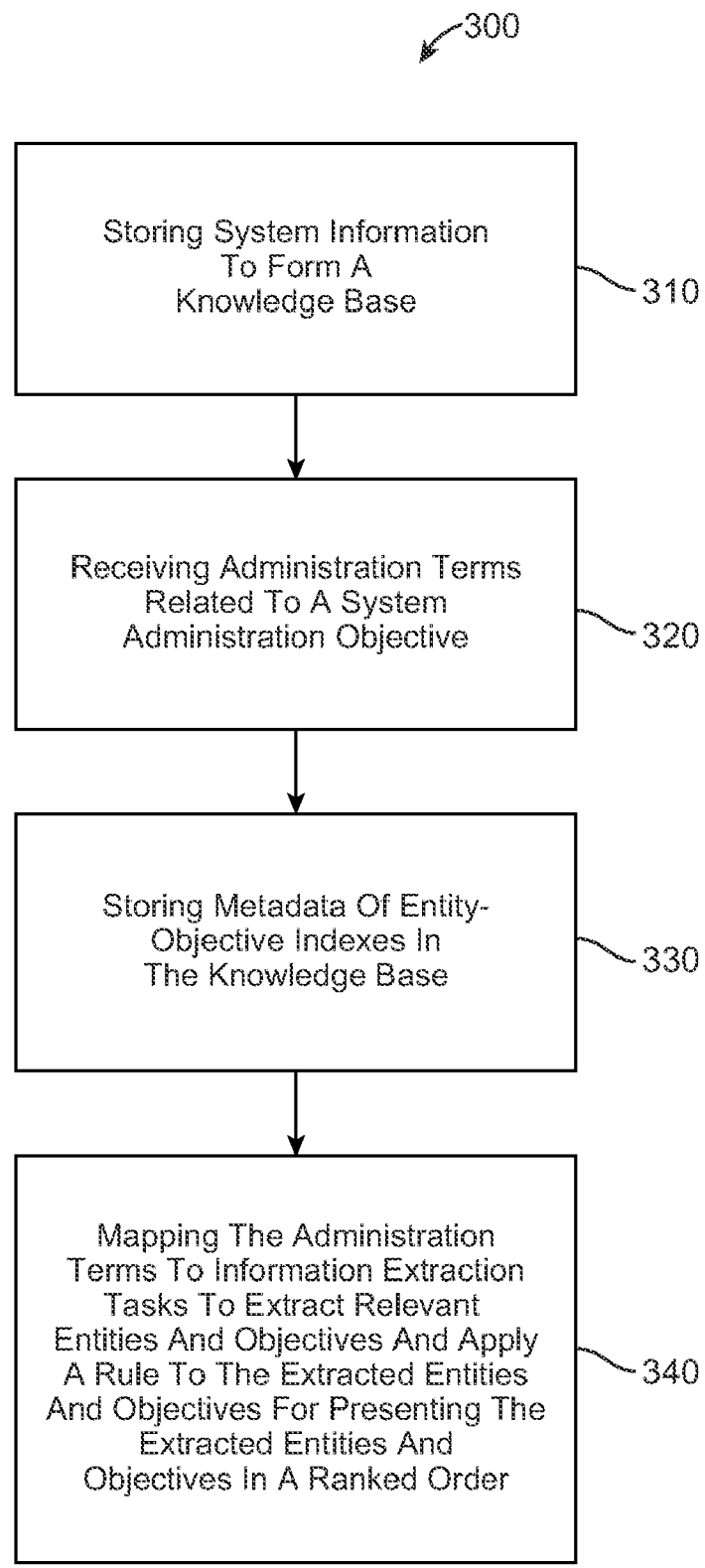
FIG. 3 illustrates a block diagram of a system administrative process according to an embodiment of the invention.

FIG. 3 illustrates a block diagram of a process 300 for assisting system administrators in managing an enterprise system, such as system 200. In block 310, system information is stored to form a knowledge base, such as knowledge base 150. In block 320, administration terms are entered or selected. These entered or selected terms relate to a goal or objective of the system administrator, such as why is the system performance degraded, are entities down?, etc. In one embodiment of the invention, if the terms are entered by an administrator, the terms are transformed into a normalized structure by an NPL, such as NPL 120.

In block 330, the meta data of entity objective indexes are stored in the knowledge base. In block 340, the entered or selected administration terms are mapped to information extraction tasks to extract relevant entities and objectives and apply a rule to the extracted entities and objectives for presenting the extracted entities and objectives in a ranked order to an administrator or user.

Figure 4:
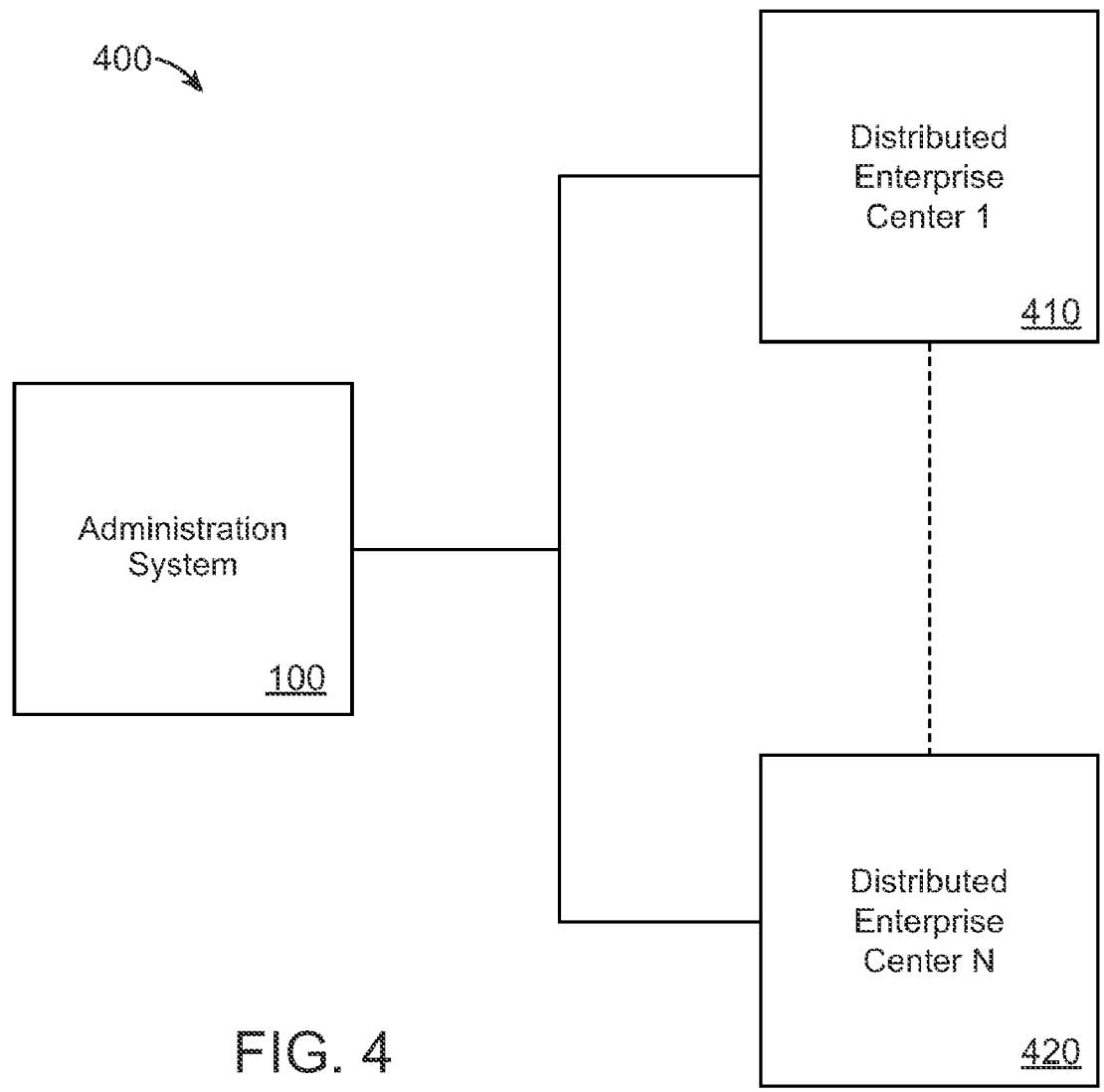
FIG. 4 illustrates a distributed system administration system according to an embodiment of the invention.

FIG. 4 illustrates a distributed system 400 according to one embodiment of the invention. In one embodiment of the invention, the system 400 is a distributed network, including a plurality of distributed data centers 1 410 to N 420 and administration system 100. In this embodiment of the invention, the distributed data centers 1 410 to N 420 each use the administration system 100.

The embodiments of the invention have advantages over prior administration assistance by having all of the current/past information indexed and mapped to create a knowledge base of administration issues. As problems are tracked with all of the system information, future system administration issues can readily be addressed through the knowledge base 150, workflow mapping module 130 and meta information module 140. Through an easy search term query, system administrators will be able to make key decisions quicker than using prior art monitors.

The embodiments of the invention, and any modules discussed, can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a random access memory (RAM), a read-only memory (ROM), a rigid magnetic disk, an optical disk, etc. Current examples of optical disks include compact disk-read only memory (CD-ROM), compact disk-read/write (CD-R/W) and digital versatile disk (DVD).

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other modifications may occur to those ordinarily skilled in the art.

What is claimed is:

1. An enterprise administration system comprising:
a user interface module that uses a hardware processor for entering administration query terms or selecting a predetermined script of administration query terms;
a knowledge base that stores system information;
a meta information module that uses the system information to store entity-objective indexes that comprise meta information for at least one entity, wherein an entity comprises one or more of a logical device and a physical device; and
a workflow mapping module that maps the administration query terms to system information extraction tasks to extract relevant entities and objectives and applies a rule to the extracted entities and objectives for presenting the extracted entities and objectives in a ranked order, wherein the workflow mapping module further creates an abstract dependency tree for logical and physical entities that are relevant to the administration query terms, and applies a degraded recipe on each of the entities in the abstract dependency tree.

2. The system of claim 1, further comprising a system management repository that stores server, network and storage information.

3. The system of claim 2, wherein the server, network and storage information includes configuration data, statistics and event data.

4. The system of claim 2, wherein the meta information module records ontologies to describe the type of information stored in the system management repository.

5. The system of claim 1, wherein the extracted entities and objectives provide information for correcting system problems, and wherein a recipe comprises information to be extracted and presented, and defines rules for analyzing the extracted information.

6. The system of claim 1, wherein the entered administration query terms are input in a natural language format.

7. The system of claim 1, wherein the workflow mapping module defines abstract templates to translate the administration query terms into information extraction tasks.

8. The system of claim 1, wherein the ranked order is based on relevancy of the extracted entities and objectives.

9. A method comprising:
storing system information to form a knowledge base;
receiving administration query terms related to a system administration objective;
storing metadata of entity-objective indexes in the knowledge base, wherein the metadata of entity-objective indexes comprise meta information for at least one entity, wherein an entity comprises one or more of a logical device and a physical device;
creating an abstract dependency tree for logical and physical entities that are relevant to the administration query terms;
applying a degraded recipe on each of the entities in the abstract dependency tree; and mapping the administration query terms to information extraction tasks to extract relevant entities and objectives and apply a rule to the extracted entities and objectives for presenting the extracted entities and objectives in a ranked order.

10. The method of claim 9, further comprising:
storing server, network and storage information in a system management repository, wherein the server, network and storage information used in the mapping.

11. The method of claim 9, wherein the extracted entities and objectives provide information for correcting system problems, and wherein a recipe comprises information to be extracted and presented, and defines rules for analyzing the extracted information.

12. The method of claim 9, wherein the mapping defines abstract templates to translate the administration query terms into information extraction tasks.

13. The method of claim 9, wherein the presented extracted entities and objectives include relevant system configuration, current and past performance information and log events for devices relevant to the administration query terms.

14. A computer program product for assisting system administration comprising a non-transitory computer usable storage medium including a computer readable program, wherein the computer readable program when executed on a computer causes the computer to:
store system information to form a knowledge base;
receive administration query terms related to a system administration objective;
store metadata of entity-objective indexes in the knowledge base, wherein the metadata of entity-objective indexes comprise meta information for at least one entity, wherein an entity comprises one or more of a logical device and a physical device;
create an abstract dependency tree for logical and physical entities that are relevant to the administration query terms;
apply a degraded recipe on each of the entities in the abstract dependency tree; and
map the administration query terms to information extraction tasks to extract relevant entities and objectives and apply a rule to the extracted entities and objectives for presenting the extracted entities and objectives in a ranked order.

15. The computer program product of claim 14, further causing the computer to:
store server, network and storage information in a system management repository, wherein the server, network and storage information are used to map the administration query terms to information extraction tasks.

16. The computer program product of claim 14, wherein the extracted entities and objectives provide information for correcting system problems, and
wherein a recipe comprises information to be extracted and presented, and defines rules for analyzing the extracted information.

17. The computer program product of claim 14, wherein the map the administration query terms to information extraction tasks further defines abstract templates to translate the administration query terms into information extraction tasks.

18. The computer program product of claim 14, wherein the presented extracted entities and objectives include relevant system configuration, current and past performance information and log events for devices relevant to the administration query terms.

* * * * *